United States Patent [19]
Hanke et al.

[11] Patent Number: 5,017,179
[45] Date of Patent: May 21, 1991

[54] FLEXIBLE COUPLING WITH LOAD VARIABLE DAMPING

[75] Inventors: Wolfgang Hanke, Heidenhelm; Viktor Kühne, Bopfingen, both of Fed. Rep. of Germany

[73] Assignee: J.M. Voith GmbH, Fed. Rep. of Germany

[21] Appl. No.: 369,825

[22] Filed: Jun. 22, 1989

[30] Foreign Application Priority Data

Jun. 22, 1988 [DE] Fed. Rep. of Germany ....... 3820998
Dec. 10, 1988 [DE] Fed. Rep. of Germany ....... 3841692

[51] Int. Cl.⁵ ........................ F16D 3/80; F16F 15/16
[52] U.S. Cl. ......................................... 464/24; 464/68
[58] Field of Search .................. 192/58 B, 106.1; 464/24, 27, 66, 68

[56] References Cited

U.S. PATENT DOCUMENTS

| | | | |
|---|---|---|---|
| 2,812,648 | 11/1957 | Croset | 464/24 |
| 2,891,394 | 6/1959 | Goloff et al. | 464/24 |
| 4,351,167 | 9/1982 | Hanke et al. | 464/24 |
| 4,775,042 | 10/1988 | Kohno et al. | 464/24 X |
| 4,828,533 | 5/1989 | Focqueur et al. | 464/24 |

FOREIGN PATENT DOCUMENTS 3329420 2/1985 Fed. Rep. of Germany ....... 464/24

Primary Examiner—Daniel P. Stodola
Attorney, Agent, or Firm—Ostrolenk, Faber, Gerb & Soffen

[57] ABSTRACT

A flexible coupling of a disk construction. One coupling half includes outside side disks and a radially exterior flange joining the side disks for enclosing an inner space for holding damping liquid. The other coupling half includes one or a plurality of middle disks disposed in the inner space. Flexible coupling elements join the disks to move together. For damping oscillation, a plurality of displacement chambers are defined at spaced intervals around the disks, each between a radially extending circumferential end wall in the middle disk and a radial surface defined on a bolt or the like extending between the outer disks. Throttle gaps control the exit of the damping fluid from the displacement chamber. Circumferentially extending partition walls located at the axially lateral sides of the displacement chamber move with the second coupling half, decreasing the size of the outlet leading to the axial gaps between the disks as the coupling halves oscillate to a greater extent with respect to each other, providing progressively stronger damping. In a further modification, a labyrinth seal is defined radially inward of a displacement chamber for further resisting the movement of damping fluid radially inwardly.

22 Claims, 2 Drawing Sheets

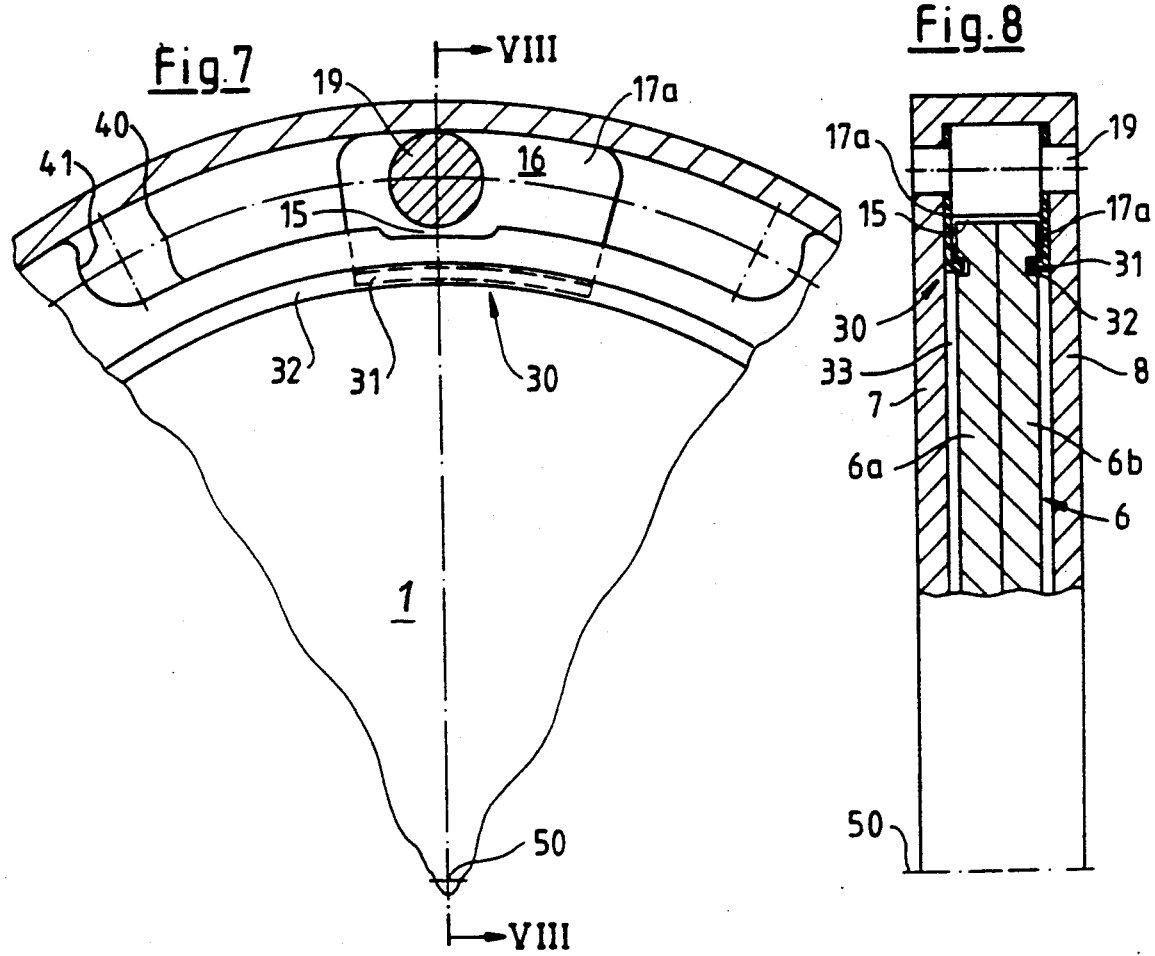

FLEXIBLE COUPLING WITH LOAD VARIABLE DAMPING

BACKGROUND OF THE INVENTION

The present invention relates to a flexible coupling, particularly useful for a double mass flywheel for internal combustion engines, which damps rotary oscillations dependent upon load conditions in the coupling.

A coupling of this type is known from Federal Republic of Germany Patent 2,848,748. (and corresponding U.S. Pat. No. 4,351,167) The coupling includes two coupling halves relatively rotatable about a hub. The first coupling half includes two axially spaced apart outer disks which are bridged radially outwardly to define an enclosed inner space for containing a damping fluid. One or a plurality of disks are connected with the second coupling half and are disposed in the inner space in the damping fluid. A flexible connection is provided between the first and second coupling halves, that is between the disks of the first coupling half and the disks of the second coupling half. In addition, relative motion between the coupling halves should be damped so that they move together and also in order to avoid oscillations. In general, there are displacement chambers defined in the disks with one circumferential side of the chamber being defined by one disk and the other circumferential side of the chamber being defined by the other disk, so that as the coupling halves oscillate with respect to each other, the fluid in the displacement chambers is compressed when the oscillations are in a particular direction, and this damps the oscillation. For damping the oscillations, the displacement chamber has throttle slots, or the like, for permitting controlled exit of fluid from the chamber for damping.

The known coupling has on the circumference of the interior space of the coupling a plurality of displacement chambers of variable volume wherein a damping fluid is forced through throttle slots upon the load induced rotation of the two coupling halves. The damping effect upon rotary oscillations connected therewith is substantially constant over the angle of oscillations. In this case also, the possibility of adapting the damping direction to the angle of twist has already been considered. However, it has been found in practice that this is not sufficient in critical applications. One main problem is to obtain optimal matching of idle load and partial loads and at the same time provide good resonant behavior. Slight damping is required in idle operation, in partial and full load operation and in push operation, but high damping is needed upon passing through the resonance speed of rotation and upon change of load.

Federal Republic of Germany OS 3,322,374 (and corresponding DE-OS 33 29 420-Al) discloses a coupling in which several outer and inner lamellae are arranged between two outer side disks. Between radially inwardly and outwardly directed extensions, there are formed a plurality of displacement chambers which are limited laterally by the adjacent lamellae. Upon the load induced twisting, the volume enclosed within the displacement chamber is reduced, but the cross section of the radially active surfaces remains constant and thus the degree of damping also remains constant.

Federal Republic of Germany Patent 3,708,345, (and corresponding commonly assigned U.S. Ser. No. 07/272,698 filed Nov. 14, 1988) which does not constitute a prior art publication, discloses a coupling with inner disks which form variable displacement chambers with corresponding extensions of the outer disk. In this connection, the inner disks experience a different twist during the rotation as a result of the construction and arrangement of the flexible spring elements. In this way, the damping produced in the displacement chamber has been so improved that the displaced volume follows approximately the increase in loading and the stepwise turning of the twisting disks. This dependence is, however, still not sufficiently effective since the gaps between the disks are too large. The disks can wobble during rotation and migrate axially on the hub so that the volumes of the displacement chambers and the throttle slots continuously change their sizes. The damping can thus not be determined sufficiently precisely and is very difficult to influence since the disks are also axially flexible.

SUMMARY OF THE INVENTION

The object of the present invention is to develop a coupling of the above type such that the damping is more sensitive than heretofore as a function of the angle of twist of one coupling half with respect to the other, so that different operating conditions can be taken into consideration even better than now. In particular, damping within the resonance region is to be improved without negatively affecting the other operational ranges.

The flexible coupling is of disk construction. It includes a first coupling half that is formed of at least one, and more frequently a plurality, of parallel middle disks, each associated with and rotatable with a central hub of the coupling. There is a cooperating second coupling half that includes side disks which are axially outward of and which bracket all of the middle disks. The side disks are connected to each other. An appropriate axially extending covering or flange joins the side disks and defines an inner space for the middle disks and which can confine damping fluid therein. The two coupling halves are intended to be rotated to a limited extent with respect to each other and for this purpose are connected to each other by flexible couplings, such as springs which at one end are connected with one of the middle disks and at the other end are connected with at least one of the side disks.

In the radially outer region of the inner space between the side disks, there is at least one displacement chamber whose volume can be changed upon twisting of the coupling halves with respect to each other. That displacement chamber is formed at one circumferential side by a radially extending surface of the middle disk and at the other circumferential side by a radially extending surface on the side disk.

Most important, between the middle disk or between each of the middle disks, and also between the axially outermost surface of the middle disks and the side disks, there is an axial gap of a width sufficient to permit radially inward flow of damping fluid from the displacement chamber radially inward through the axial gap in the inner space. In addition, there is a throttle gap enabling throttling of flow circumferentially. With the axial gaps essentially unobstructed, relatively rapid radially inward flow of damping fluid is permitted, so that there is little damping resistance. The invention comprises means for blocking off the available axial gap through which radial flow from the displacement chamber occurs to a varying extent, depending upon the relative angle of twist from a central position between the first and second coupling halves. In particular, the invention selectively blocks the axial sides of the displacement chamber to a varying extent depending upon the angle of twist. For this purpose, partition walls are provided attached to the coupling half that includes the side disks, and those partition walls are movable with respect to the displacement chamber for selectively blocking the axial sides of the displacement chamber to varying extents to block exit of damping fluid therefrom into the axial gap to move radially inward. At a greater angle of twist, the partition walls block more of or eventually the entirety of the axial sides of the displacement chamber, which increases the damping force and is dependent upon the degree of twisting of the first and second coupling halves with respect to each other.

The basic concept of the invention can be realized in various ways. In one technique, the axial gap between the central disk coupled to one coupling half and the side disks coupled to the other coupling half is of different size at different angles of twist. One important idea is to use special partition walls for axially limiting the individual displacement chambers.

By this measure, the displacement chamber is blocked off even better axially from the rest of the inner space of the coupling, so that the part of the other half coupling active therein contributes with its radially extending active surface even more effectively for the damping of rotary oscillations.

According to the invention, for lateral limitation of the displacement chambers, partition walls are specifically provided. This assures that the cross sections of all of the throttle gaps retain their predetermined size under the different operating conditions, namely radially inward as well as from the one part of the displacement chamber to the other.

Another important development of the invention comprises the partition walls extending in the circumferential direction in the load free middle position only over a part of the corresponding displacement chamber. As a result, with a slight angle of twist, the available cross section for the radial discharge is initially large and therefore the damping force is initially small. With an increase in angle of twist, the available cross section for discharge decreases and therefore the damping force increases.

With increasing angle of twist, the displacement chamber is completely covered even with short partition walls as seen in circumferential direction. At this moment, an abrupt increase takes place in the damping force since the radial discharge of the damping fluid takes place through extremely narrow axial gaps. To prevent this abrupt change, the invention comprises the end regions of the partition walls being shaped correspondingly, for example, with a soft curvature or bevel. The abruptness of the increase also can be influenced by corresponding dimensioning of the wall thicknesses, of the middle disk, the side disks or the partition wall itself.

Aside from the measures for influencing the radial discharge, the ordinary measures for the discharge or overflow in the circumferential direction can be retained. See, for example, Federal Republic of Germany Patent 2,848,748, particularly FIG. 4.

The embodiment with partition walls has particular advantages:

(a) The partition walls, which in general are plate shaped elements, serve at the same time as spacers in order to maintain the axial spacing between the individual disks constant. This provides well defined spacings, which are constantly retained, and wobbling of the individual disks is prevented. The axial gap which is essential for the invention is thereby first defined and fixed.

(b) There are possibilities of favorable pairings of materials, for instance, selected plastics for the plate with the steel of the rest of the coupling. This can be of importance, in particular, when the damping fluid has poor or no lubricating properties. Furthermore, optimizing of the frictional values and abrasion properties are possible.

(c) Plate shaped partition walls represent inexpensive components which can easily be modified in shape. Therefore it is possible to in principle retain the same type of flexible coupling and merely to change the shape of the plate for individual applications of use so as to obtain different damping characteristics.

To improve the damping behavior of the coupling, particularly in the region of resonance of the drive motor, the displacement chamber is limited laterally by partition walls which extend radially inward on both sides of the central or middle disk and have a seal located to act radially inward with respect to the middle disk. In this way, the damping fluid present in the displacement chamber is prevented by the high flow resistance caused by the seal from escaping into the radially inner coupling space and at the same time is compelled either to remain for the most part in the displacement chamber or to escape only via the cross sections provided for the discharge. In this way, particularly with the large angles of twist which occur in the resonance region, high damping is obtained and the damping chamber contains a sufficient amount of damping fluid to produce the desired damping. By centrifugal force, the outer annular region of the coupling is always filled with fluid before the displacement chambers, without given amounts having to flow with subsequent delays caused by the radially inner region or not being available in the event of an occurrence of a resonance amplitude.

If the seal is developed as a contact free labyrinth seal, then wear and undesired frictional damping are eliminated in the case of small angles of twist in which little damping is desired. The center disk can be formed of two substantially identical halves, each having an axially outward annular groove for the contact free seal. This makes simple and rational manufacture possible. The partition walls can be comprised of plastic with projections formed thereon for the labyrinth seal with respect to the center disk.

Other objects and features of the invention are explained further with reference to the drawings.

BRIEF DESCRIPTION OF THE DRAWINGS

FIG. 7 shows a diagrammatic cross section through a displacement chamber; and

FIG. 8 shows a diagrammatic longitudinal section along the line II—II of FIG. 7.

DESCRIPTION OF THE PREFERRED EMBODIMENTS

Figure 1:
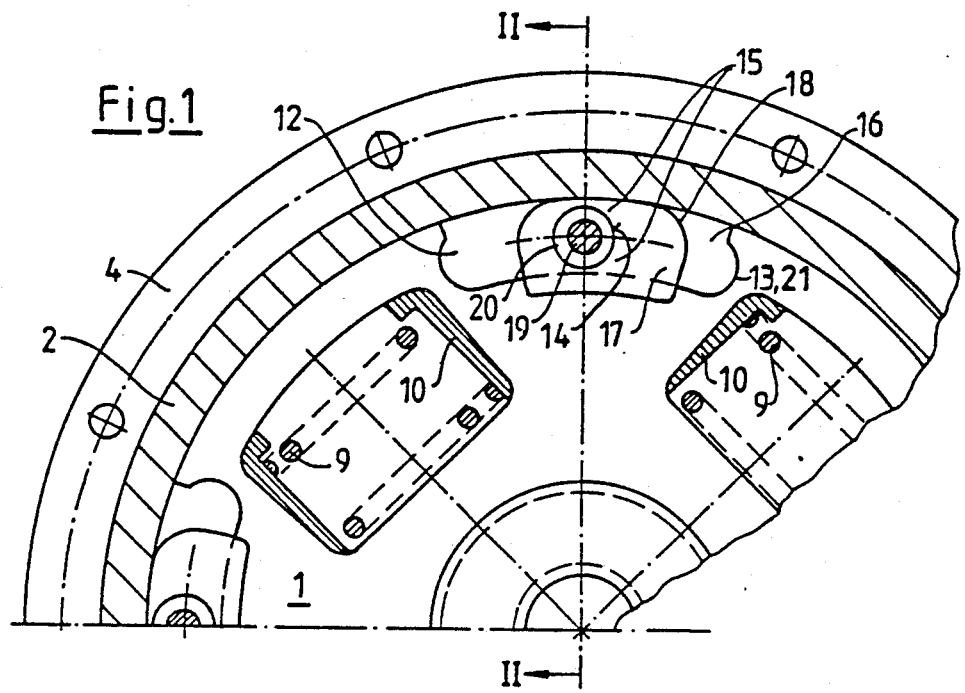
FIG. 1 shows a partial cross section through a flexible coupling along the line I—I of FIG. 2.
Figure 2:
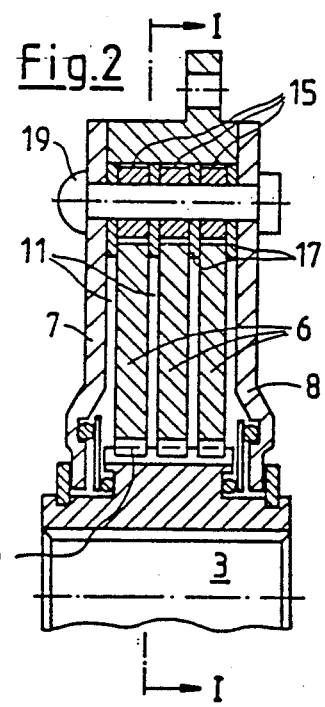
FIG. 2 shows a partial longitudinal section along the line II—II of FIG. 1.

The flexible coupling according to the invention includes the following components. A first coupling half 1 has a hub 3 and has, for instance, three middle disks 6 attached to the first coupling half. A second coupling half 2 includes two side disks 7 and 8 which surround the first coupling half 1 on both axial sides and includes an outward flange 4 located radially outward of the disks 6 and joined to the disks 7 and 8. The elements of the second coupling half form a liquid tight inner space 11 which can be filled with a damping fluid. Flexible coupling elements developed as springs 9 with spring washers 10 are disposed between the side disks 7, 8 and the middle disks 6.

Figure 3:
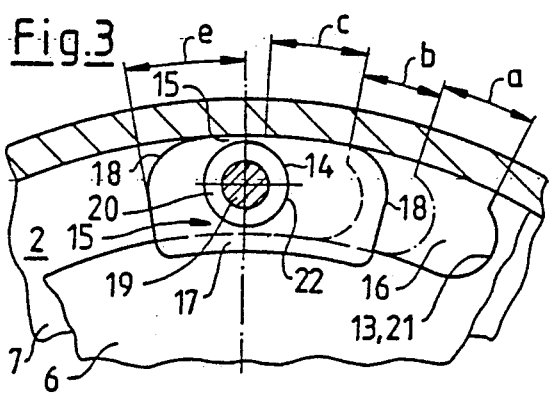
FIG. 3 shows a detail of the partition walls.

The middle disks 6 have a plurality of recesses 12 at spaced intervals around their outer circumference so that radially extending opposite active surfaces 13 are produced on both circumferential ends of each recess 12. Partition walls 17 preferably comprised of thin sheet metal are arranged between the middle disks 6 and also between the axially outermost middle disks and the surrounding side disks 7, 8. As seen in FIGS. 1 and 3, partition walls 17 are shorter circumferentially than the respective recess 12 with which each cooperates and are slightly wider radially inward. Spacer sleeves 20 are also arranged between the partition walls. The partition walls 17 and the spacer sleeves 20 are threaded together on a bolt 19 which extends in the axial direction between the side disks 7, 8. Thus, the partition walls 17 move with the second coupling half, with respect to the middle disks 6 and the recesses 12 on the first coupling half.

Displacement chambers 16 are formed on the middle disks 6 circumferentially between the generally radially extending surfaces 14 on spacer sleeves 20 and the radial surfaces 13 on middle disks 6. The partition walls 17 will define the axial sides of the displacement chambers as discussed below. The displacement chambers are limited radially outwardly by the flange 4 on the second coupling half 2 and radially inwardly by the recesses 12 on the middle disks 6 on the first coupling half. The diameter of the spacer sleeve 20 is selected so that circumferentially extending throttle gaps 15 are produced both radially outward and radially inward of the sleeve 20. The damping fluid is forced through those gaps 15 upon the relative twisting of the two coupling halves which varies the circumferential size of the chambers 16 between radial surfaces 13 and 14. The thickness of the spacer sleeves 20 corresponds essentially to the thickness of the middle disks 6.

The partition walls 17 extend in the circumferential direction to such an extent that the radial surfaces 13 at the ends of the recesses 12 are circumferentially outside the region of the partition walls 17 in the condition of the coupling without any torque or with small torque. FIG. 3 shows that the radial surfaces 13 enter between the partition walls 17 only as from an angle of twist a. In the region of the angle of twist c, which corresponds to a high torque, the displacement chamber 16 is limited laterally only by the partition walls 17. With a small torque, the damping fluid can be displaced also radially inward outside the partition walls 17 (reduced damping effect), while an almost tight displacement chamber exists upon high torques in the region of the angle of twist c. In that case, the damping fluid can flow to the other side only through the predetermined throttle gaps 15. This results in the desired strong damping in the region of high torques. It is advantageous in this connection for the radial inner sides of the partition walls 17 to extend radially inward enough to cover the middle disks 6 in the region of the recesses 12 in order to assure particularly good fluid tightness.

In order to avoid a jolt upon entrance of the radial surfaces 13 of the middle disks 6 into the tight displacement chambers formed by the partition walls 17, the front side 18 of the walls 17 in the circumferential direction can be shaped to deviate from the radial direction. The surfaces 18 enter the displacement chambers 16 gradually. In FIG. 3, the front sides 18 are shown curved. This has the advantage that the radial surfaces 13 can completely enter the region of the partition walls only in the angular region b. An even softer entrance can be obtained if the partition walls 17 are made in the same circumferential direction of different size within a coupling so that a stepwise entering of the radial surfaces 13 takes place and thus a softer increase in the damping force.

For obtaining special characteristics of the coupling, it may be advantageous to develop the damping chambers of different sizes for movements in the two opposite circumferential directions. The partition walls for the lateral limitation of the damping chambers can for this purpose be developed with different radial depth as shown in FIGS. 1 and 3, and therefore, for instance, in such a manner that the angle of twist e for the direction of push is smaller than the angle of twist b+c for the direction of pull.

Figure 4:
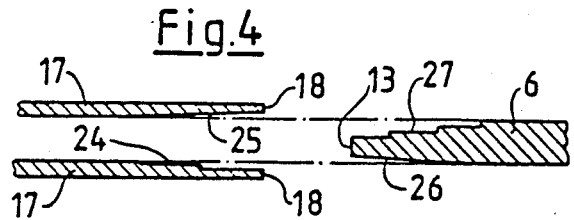
FIG. 4 shows a detail of variously shaped transition regions on the partition wall and/or the center disk.

FIG. 4 shows a possibility for an even better gradation of the damping as a function of the angle of twist. For this purpose, the wall thickness of the partition walls 17 can be reduced toward the circumferential end 18 either in the form of steps 24 (bottom of FIG. 4) or as tapered surface 25 (top of FIG. 4). Such a taper can also or alternatively be applied on the middle disk 6 in the form of steps 27 (top of FIG. 4) or a wedge surface 26 (bottom of FIG. 4). With these measures the damping upon the entrance of the radial surface 13 between the partition walls 17 can be increased as required.

The wall surfaces of the spacer sleeves 20 between the partition walls 17 form, as mentioned above, the mating surface 14 in the displacement chamber 16. This surface can be used as a fixed stop 22 against which the middle disks 6 strike after turning through the angle c. The surfaces 13 are advantageously provided with recesses 21 which correspond to the contour of the spacer sleeves 20 and are therefore circular in the present embodiment. In this way a pressure cushion and dampened impact are produced also immediately prior to reaching the fixed stop, i.e., the spacer sleeves 20.

Figure 5:
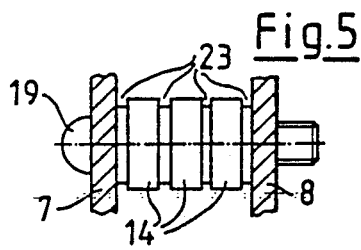
FIGS. 5 and 6 are respective axial and radial views showing a variant attachment for the partition walls.
Figure 6:
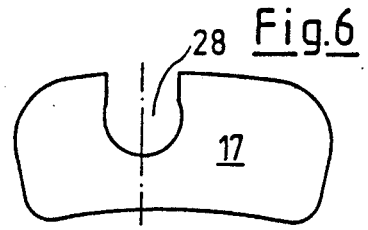

Instead of the attachment of the partition walls by spacer sleeves 20, the embodiment of FIG. 5 has a bolt 19 with annular grooves 23 and an outside diameter which corresponds to the spacer sleeves. The partition walls can be resiliently engaged in these annular grooves which are arranged at exact distances apart. In accordance with FIG. 6, the partition walls 17 are in this case provided with radially outward directed openings 28 which engage resiliently into the annular grooves 23 of the bolt 19.

FIG. 7 shows diagrammatically a partial section through the displacement chamber of a coupling which in principle corresponds to that of FIG. 1. The middle disk 6 is provided with recesses 40 on its outer circumference, whereby cams 41 are formed which represent radial walls and are active in the circumferential direction.

In the region of the recesses 40, there is a transverse wall developed, for instance, as a bolt 19. Throttle gaps 15 change with the relative twisting being arranged between the bolt 19 and the radially outer, substantially circular contour of the recess 40. Between the middle disk 6 and the side disks 7, 8 there is an axial gap 33. A partition wall 17a which is attached in the region of the bolt 19 is located in this axial gap which extends up into the radially outward region of the inner space 11. Due to the fact that the partition wall 17a extends in both circumferential directions, a displacement chamber 16 is formed. The axial width of that chamber corresponds to the thickness of the middle disk 6. Upon the entrance of one of the cams 41 into the displacement chamber 16 due to load induced twisting, damping fluid which is present in the inner space 11 is displaced through the radial gaps 15 and axial gaps between partition wall 17a and middle disk 6. In order to intensify the damping of this lifting movement, a contact-free labyrinth seal 30 is provided, in accordance with the invention, on the partition wall 17a. For this purpose, the partition walls 17a have projections 31 which extend concentric to the coupling axis 50 and enter free of contact into similarly placed annular grooves 32 in the radial surfaces of the middle disk 6. In this way, the resistance of flow of the damping fluid toward the radially inner region of the coupling is increased so strongly that a stronger damping of the relative twisting of the coupling halves 1, 2 occurs. There is concerned here a hydrodynamic damping which is determined only by the torque surges which occur. Undesirable friction damping, which would occur in particular upon low speeds of rotation and low torque, does not occur, due to the absence of contact of the parts defining the labyrinth, so that the effect of the seal can enter into action as desired primarily in the operating range and large angles of twist.

FIG. 8 shows a longitudinal section through the coupling along the line VIII—VIII of FIG. 7. There can be noted therein the gap 33 between the middle disk 6 and the side disks 7, 8. In the present embodiment the partition walls 17a are fastened together with the bolt 19, between the side disks 7, 8.

In order to simplify the manufacture of the middle disk 6, it can be comprised of two halves 6a and 6b. As a result, it is not necessary to provide the middle disk on both sides with annular grooves 32. Instead, two unilaterally machined halves 6a and 6b are assembled concentrically.

Due to the possibility of developing the partition walls 17 differently with respect to their thickness, their width in the corresponding circumferential direction and the development of the wall thickness of the end 18, numerous possibilities of use result, for couplings of the type mentioned above in double-mass flywheels and for other flexible couplings, and also as independent oscillation dampers.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A flexible coupling of disk construction, comprising:
   a first coupling half comprising a hub and at least one middle disk on the hub rotatable around the axis of the hub;
   a second coupling half also rotatable around the axis of the hub independently of the rotation of the first coupling half, the second coupling half being comprised of two axially spaced apart side disks disposed on opposite sides of the at least one middle disk, and the side disks being connected to each other to rotate together; means radially outward of the middle disk joining the side disks for defining an inner space over the middle disk and in which damping fluid may be located;
   at least one displacement chamber being defined within the inner space between the side disks, the displacement chamber being formed at one circumferential side by a radially extending surface on at least one middle disk and being formed on the other circumferential side by a radially extending surface attached to the side disks such that the first radial surface and the second radial surface move circumferentially toward and away from each other with the relative twisting of the first and second coupling halves with respect to each other;
   axially between the middle disk and the side disks associated therewith, an axial gap being defined of an axial width sufficient to permit radially inward flow of damping fluid from within the displacement chamber axially out of the displacement chamber into the axial gap and then radially inwardly through the axial gap; and
   means for progressively preventing exit of damping fluid from the displacement chamber directly into the axial gap by adjusting the circumferential length of the axial side of the displacement chamber, thereby controlling the radially inward flow of damping fluid from the displacement chamber depending upon the relative angular twist of the first and second coupling halves.

2. The flexible coupling of claim 1, wherein the first and second coupling halves are relatively rotatable with respect to each other, and further comprising flexible coupling elements between the first and second coupling halves to limit the extent of relative rotation of the coupling halves with respect to each other.

3. The flexible coupling of claim 1, wherein the displacement chamber is disposed substantially in the radially outer region of the inner space defined between the side disks.

4. The flexible coupling of claim 1, wherein there are a plurality of the middle disks disposed between the side disks, and a respective axial gap is defined between each two of the middle disks and also between the side disks and the adjacent middle disks.

5. The flexible coupling of claim 1, wherein at least one of the disks is of varying thickness over the displacement chamber over the angle of twist.

6. A flexible coupling of disk construction, comprising:
   a first coupling half comprising a hub and at least one middle disk on the hub rotatable around the axis of the hub;
   a second coupling half also rotatable around the axis of the hub independently of the rotation of the first coupling half, the second coupling half being comprised of two axially spaced apart side disks disposed on opposite sides of the at least one middle disk, and the side disks being connected to each other to rotate together; means radially outward of the middle disk joining the side disks for defining an inner space over the middle disk and in which damping fluid may be located;

at least one displacement chamber being defined within the inner space between the side disks, the displacement chamber being formed at one circumferential side by a radially extending surface on at least one middle disk and being formed on the other circumferential side by a radially extending surface attached to the side disks such that the first radial surface and the second radial surface move circumferentially toward and away from each other with the relative twisting of the first and second coupling halves with respect to each other;

axially between the middle disk and the side disks associated therewith, an axial gap being defined of an axial width sufficient to permit radially inward flow of damping fluid from within the displacement chamber axially out of the displacement chamber into the axial gap and then radially inwardly through the axial gap; and means for preventing exit of damping fluid from the displacement chamber directly into the axial gap by adjusting the circumferential length of the axial side of the displacement chamber, thereby controlling the radially inward flow of damping fluid from the displacement chamber depending upon the relative angular twist of the first and second coupling halves wherein the means for preventing exit of damping fluid from the displacement chamber comprises a respective partition wall supported on one of the coupling halves for rotation with the respective coupling half with respect to the other coupling half, and the partition wall being placed so as to block at least one axial side of the displacement chamber as the coupling halves rotate with respect to each other to thereby prevent axial movement of the damping fluid from the displacement chamber directly into the adjacent axial gap.

7. The flexible coupling of claim 6, wherein there is a respective partition wall on each axial side of a displacement chamber for blocking both axial sides of the displacement chamber for blocking the axial gap on each side of the displacement chamber.

8. The flexible coupling of claim 6, wherein the partition walls are defined on the second coupling half.

9. The flexible coupling of claim 6, wherein at least one of the disks is of varying thickness over the displacement chamber over the angle of twist.

10. The flexible coupling of claim 9, wherein the thickness of the partition wall changes over the angle of twist.

11. The flexible coupling of claim 6, wherein the thickness of the partition wall changes over the angle of twist.

12. The flexible coupling of claim 6, wherein the partition wall is of a circumferential length to only partially cover the respective displacement chamber in the circumferential direction.

13. The flexible coupling of claim 6, wherein the first coupling half includes a plurality of the middle disks arranged on the hub, the middle disks being spaced apart corresponding substantially to the thickness of the partition wall between neighboring ones of the middle disks, and the respective partition wall between the neighboring middle disks, and each of the middle disks including respective ones of the displacement chambers which are aligned axially among the middle disks.

14. The flexible coupling of claim 6, wherein the partition walls are so located circumferentially with respect to the displacement chambers and the partition walls are of such circumferential lengths that the partition walls are positionable at a load free central position with respect to the displacement chambers and the partition walls extend to a different extent in a circumferential direction from the central position for obtaining displacement chambers of varying size and of varying access from the displacement chambers to the axial gaps between disks.

15. The flexible coupling of claim 6, wherein the partition walls comprise thin plates.

16. The flexible coupling of claim 6, further comprising an element extending in the axial direction between the side disks and in the radially outer region of the second coupling half for supporting the partition walls.

17. The flexible coupling of claim 16, wherein the element is located in the radially outer region of the second coupling half at a radial and circumferential location as to extend through a respective displacement chamber and supporting the partition walls at the displacement chamber.

18. The flexible coupling of claim 17, wherein the element is shaped to define first radial surface for one circumferential end of the displacement chamber for cooperating with the second radial surface on the other coupling half, the element also cooperating with and defining a fixed stop for the second radial surface as the coupling halves move circumferentially with respect to each other.

19. The flexible coupling of claim 6, further comprising a seal provided on at least one side of the middle disk radially inwardly of the displacement chamber and circumferentially in the region of the displacement chamber for obstructing radially inward flow of damping fluid displaced from the displacement chamber into the axial gap space.

20. The flexible coupling of claim 19, wherein the middle disk has opposite sides and a respective one of the seals is defined on each opposite side of the middle disk, the seal comprising annular grooves defined in the outwardly facing radial surfaces of the middle disk; and the partition walls cooperating with the middle disk having annular projections thereon concentric to the axis of rotation of the coupling and at the radial position to extend into the annular grooves in labyrinth fashion for defining the seals.

21. The flexible coupling of claim 20, wherein the middle disk is comprised of two parts arranged next to each other and each respectively shaped to have a respective one of the grooves on the axially outwardly facing surface thereof, while the two parts come together on the opposite surface thereof for together defining the middle disk.

22. The flexible coupling of claim 20, wherein the partition walls are comprised of plastic and the projections are formed on the partition walls.

* * * * *